US 6,703,925 B2

(12) United States Patent
Steffel (10) Patent No.: US 6,703,925 B2
(45) Date of Patent: Mar. 9, 2004

(54) MONITORING DEVICE FOR VEHICLES, IN PARTICULAR, MOTOR VEHICLES

(75) Inventor: Hans-Clemens Steffel, Stuttgart (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/771,140

(22) Filed: Jan. 26, 2001

(65) Prior Publication Data

US 2001/0022550 A1 Sep. 20, 2001

(30) Foreign Application Priority Data

Jan. 28, 2000 (DE) .......................... 100 03 643

(51) Int. Cl.[7] ................................. B60Q 1/00
(52) U.S. Cl. ................. 340/425.5; 340/438; 348/148; 348/151
(58) Field of Search .................. 340/425.5, 438, 340/815.4, 426, 433, 937; 348/148, 151

(56) References Cited

U.S. PATENT DOCUMENTS 5,289,321 A * 2/1994 Secor ......................... 359/896
5,355,284 A * 10/1994 Roberts ....................... 362/30
5,550,677 A * 8/1996 Schofield et al. ........... 359/604
5,570,127 A * 10/1996 Schmidt ..................... 348/148
6,151,065 A * 11/2000 Steed et al. ................. 348/148
6,158,655 A * 12/2000 DeVries, Jr. et al. ....... 235/380
6,246,933 B1 * 6/2001 Bague ........................ 340/438
6,278,377 B1 * 8/2001 DeLine et al. ............ 340/815.4
6,302,545 B1 * 10/2001 Schofield et al. ........... 359/601
6,320,610 B1 * 11/2001 Van Sant et al. ........... 348/143
6,405,112 B1 * 6/2002 Rayner ....................... 701/35

* cited by examiner

Primary Examiner—Toan Ngoc Pham
(74) Attorney, Agent, or Firm—Gudrun E. Huckett (57) ABSTRACT

A monitoring device for vehicles has a housing and at least one mirror glass arranged in the housing so as to have a front side facing an observer. The at least one mirror glass has a reflective layer being reflective in the visible spectral range of light. At least one camera is arranged behind the reflective layer in a viewing direction viewed from the front side. The monitoring device can be used for driver identification, monitoring the driver's condition, identifying passengers and passenger positions, controlling airbags, theft surveillance, and similar purposes.

16 Claims, 9 Drawing Sheets

MONITORING DEVICE FOR VEHICLES, IN PARTICULAR, MOTOR VEHICLES

BACKGROUND OF THE INVENTION

1. Field of the Invention

The invention relates to a monitoring device for vehicles, in particular, motor vehicles, comprising a mirror glass behind which at least one camera is arranged.

2. Description of the Related Art

Interior rearview mirrors of motor vehicles are known which are provided with a sensor. In order for the sensor to fulfill its function, the mirror glass is provided with a cutout. However, cutouts in the reflective layer of mirror glass are generally not acceptable for esthetic reasons. Often, it is also desired that the sensor be invisible. Moreover, there are also regulations in the automobile industry which concern the geometric size of the mirror surface.

SUMMARY OF THE INVENTION

It is an object of the present invention to configure the monitoring device of the aforementioned kind such that the camera is not visible behind the mirror glass, but such that the mirror glass still can fulfill its function reliably.

In accordance with the present invention, this is achieved in that the mirror glass comprises a reflective layer which is reflective within the visible spectral range of light and behind which the camera is arranged.

In the monitoring device according to the invention, the camera is positioned behind the reflective layer which is designed to reflect preferably up to 50% within the visible spectral range of light. Accordingly, the camera is not visible behind the mirror glass while the mirror glass has the desired high reflection. When the mirror glass is, for example, used as an interior rearview mirror of a motor vehicle, the reflective layer has a reflective spectrum for reflecting light with the minimum percentage required pursuant to the regulations for automotive mirrors. Advantageously, the camera is a CCD (charge coupled device) camera or CMOS (complementary metal oxide semiconductor) camera. The mirror glass with the reflective layer is sufficiently transparent within the near infrared range that video images can be taken with such a camera. In the case that the illumination is not sufficient, it is possible to provide additional illumination by means of an auxiliary lighting unit, preferably in the form of LEDs (light-emitting diodes) which emit a wavelength for which the reflective layer is sufficiently transparent and for which the camera has a satisfactory sensitivity. In the case of bad lighting situations within the visible range, the required area can be additionally illuminated, undetected by the human eye, by moving, for example, the transparent spectral range of the mirror glass along the wavelength axis such that the transmission reaches a maximum value and covers at the same time the sensitivity maximum of the CCD or CMOS camera. The auxiliary lighting unit is advantageously realized by infrared LEDs which emit a light in the wavelength range which is within the transmission range of the reflective layer and for which the camera has the required sensitivity.

The camera is advantageously connected to the electric power supply of the motor vehicle. The video images taken by it can be shown on a monitor. However, it is also possible to store the video images on a storage medium, for example, a video tape, a hard disk etc. It is also possible to store the image and simultaneously show it on a monitor.

DESCRIPTION OF THE PREFERRED EMBODIMENTS

Figure 1:
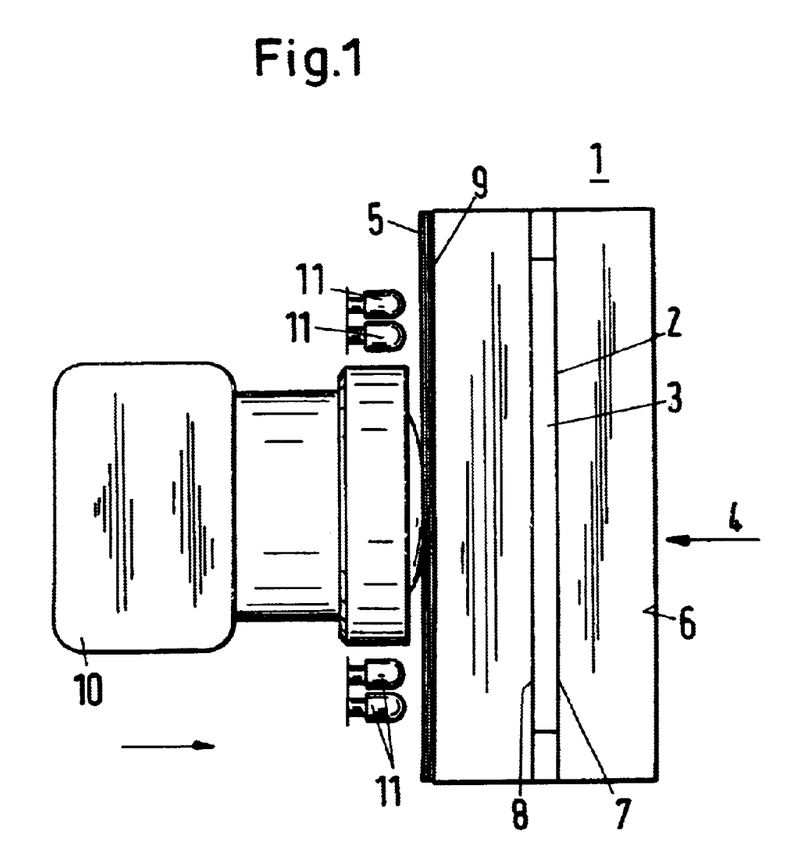
FIG. 1 is a side view illustrating schematically a device according to the invention.

FIG. 1 shows an electrochromic mirror glass 1 for interior rearview mirrors of motor vehicles. The electrochromic mirror glass 1 has at approximately half its thickness a receptacle 2 for an electrochromic liquid 3. The driver of the motor vehicle looks onto the mirror glass 1 in the viewing direction illustrated by arrow 4. At the backside of the electrochromic mirror glass 1, facing away from the driver, a backside interference reflective layer 5 is provided. The interference reflective layer 5 extends advantageously across the entire backside of the electrochromic mirror glass 1. As a result of the described configuration, the electrochromic mirror glass has four sides 6 to 9. The interference reflective layer 5 is provided on the side 9 of the electrochromic mirror glass 1 facing away from the driver.

A camera 10 is positioned behind the electrochromic mirror glass. The camera 10 is advantageously a CCD or CMOS camera. This camera 10 is designed to take video images. In the case that the illumination for the camera 10 is not sufficient, light sources 11 are provided which are advantageously in the form of LEDs. The light sources 11 are provided in a number which provide sufficient illumination and emit a wavelength for which the electrochromic mirror glass 1 is sufficiently transparent and for which the employed camera 10 has a sufficient sensitivity. Depending on the light conditions, the light sources 11 can be switched on in order to obtained optimally lighted video images.

Figure 2:
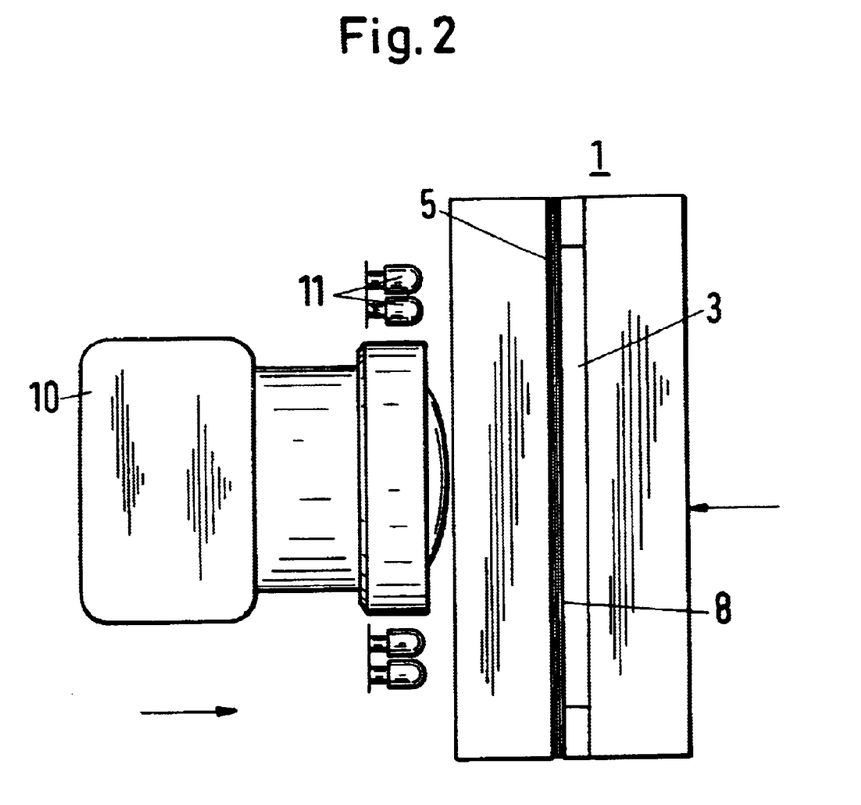
FIG. 2 shows in an illustration corresponding to that of FIG. 1 a second embodiment of a device according to the invention.

FIG. 2 shows the possibility of providing the interference reflective layer 5 on the third side 8 in direct contact with the electrochromic liquid 3. Since the interference reflective layer 5 is not provided at the backside of the electrochromic mirror glass 1, it now provides a front side interference reflective layer. In other respects, the electrochromic mirror glass 1 as well as the camera 10 and the light sources 11 are of the same configuration as in the previously described embodiment.

Figure 3:
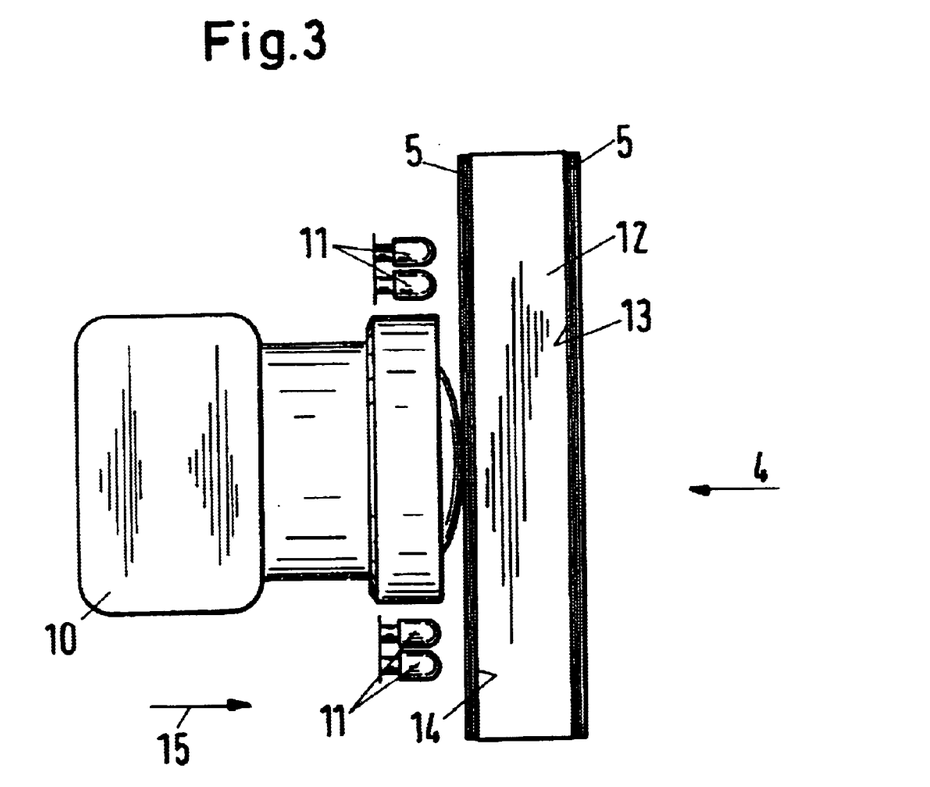
FIG. 3 is an illustration corresponding to FIG. 1 of a third embodiment of the device according to the invention.

FIG. 3 shows the possibility of using the camera 10 when no electrochromic mirror glass is present: the conventional mirror glass 12 according to FIG. 3 has only two sides, i.e., the front side 13 facing the driver and the backside 14. The interference reflective layer 5 can be provided, as desired, on the front side 13 or the backside 14. The driver looks again in the viewing direction of arrow 4 onto the mirror glass 12. The camera 10 behind the mirror glass 12 is oriented in the direction of arrow 15. It can be embodied according to the previous embodiments as a CCD or CMOS camera. In addition, light sources 11 can be provided which, in accordance with the preceding embodiments, are also located on the side of the mirror glass 12 facing away from the driver in the viewing direction 4 of the driver.

Figure 4:
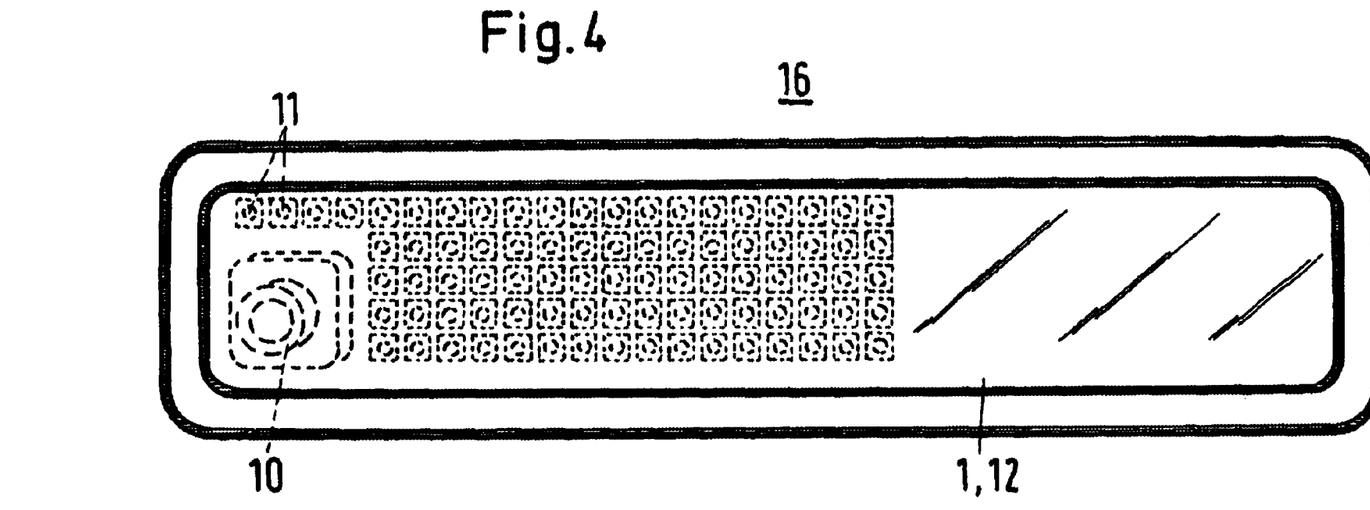
FIG. 4 is a view of an interior rearview mirror for a motor vehicle with the device according to the invention being arranged in the interior rearview mirror.
Figure 5:
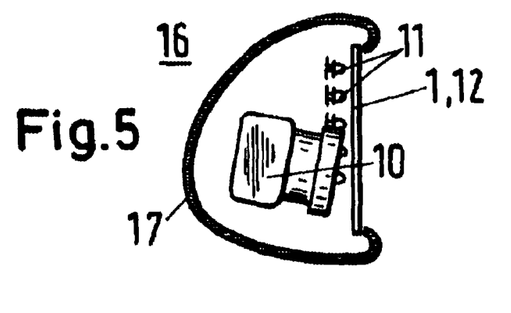
FIG. 5 is a schematic sectional illustration of the interior rearview mirror according to FIG. 4.

FIGS. 4 and 5 show an interior rearview mirror 16 with a mirror housing 17 having the mirror glass 1 or 12 inserted therein at its open front side. The camera 10 is positioned behind the mirror glass 1, 12 in the lower left corner of the interior rearview mirror 16 which is rectangular in a plan view. The camera 10, as illustrated in FIG. 5, is arranged to be slightly slanted to the rear. The light sources 11 are arranged behind the mirror glass 1, 12 in the form of a matrix, i.e., arranged in rows adjacent and underneath one another (rows and columns; see FIG. 4 ). They are advantageously provided over the entire backside of the mirror glass 1, 12 with the exception of the area of the camera 10. The arrangement according to FIGS. 4 and 5 is advantageous, in particular, when a conventional (non-electrochromic) mirror glass 12 is used for the interior rearview mirror 16.

Figures 6, 7:
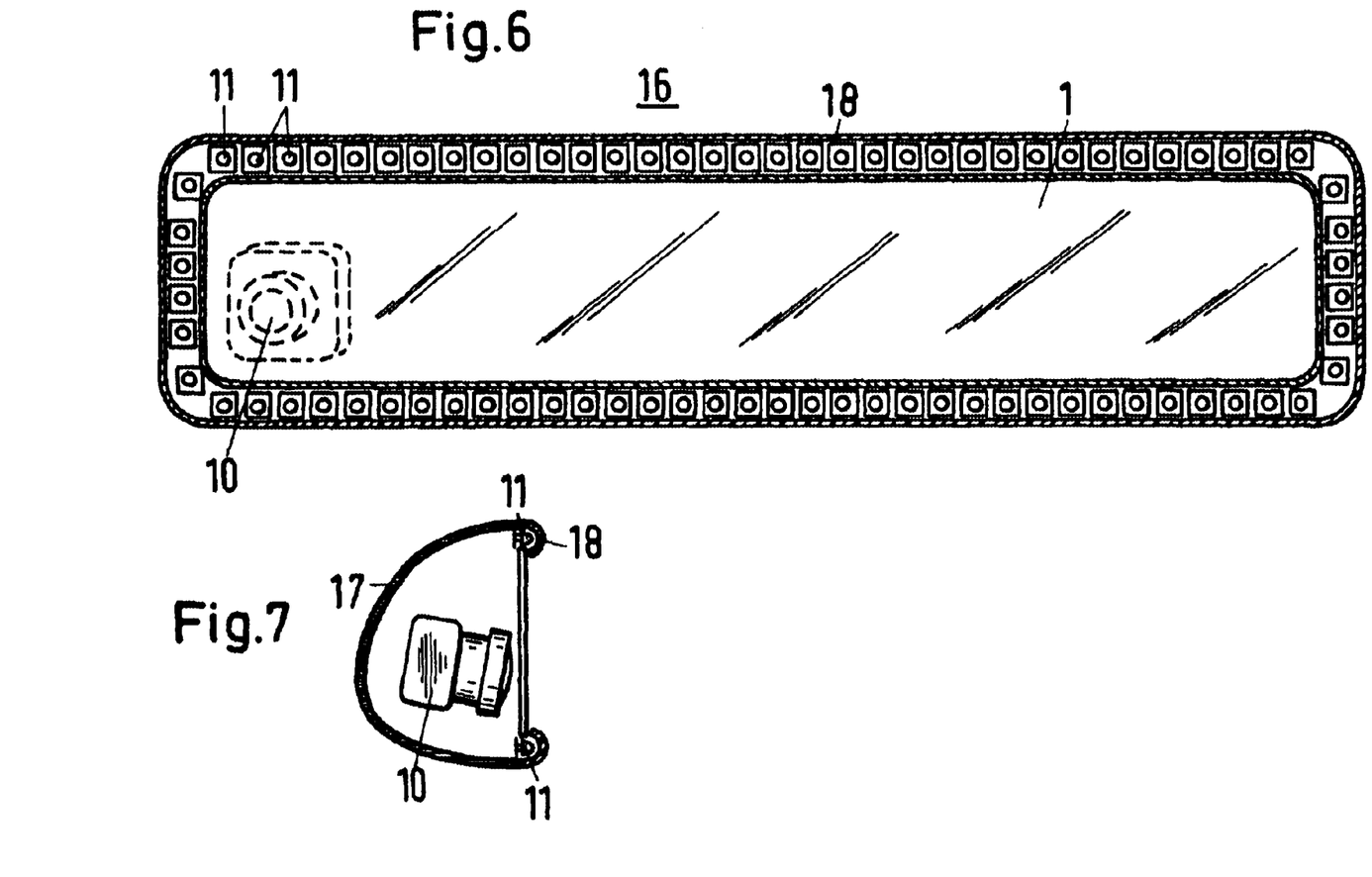
FIG. 6 shows a different embodiment of an interior rearview mirror for a motor vehicle in a representation similar to that of FIG. 4.
FIG. 7 is a schematic sectional illustration of the interior rearview mirror according to FIG. 6.

When the interior review mirror 16 is provided with an electrochromic mirror glass 1 (FIGS. 6 and 7), the light sources 11, which, in accordance with the preceding embodiments, are infrared sending LEDs, are advantageously positioned on the rim 18 of the mirror housing 17. When a conventional titanium or chromium or titanium-chromium layer is used as the reflective layer, the transmission in conjunction with the darkened electrochromic layer can already be so minimal that additional illumination may be required. Advantageously, an infrared illumination is selected that is within a spectral range of the camera sensitivity. Since the losses become too large as a result of double penetration of the reflective layer and the electrochromic layer 3 (FIG. 1), the infrared sending LEDs are advantageously arranged on the rim 18 of the mirror housing 17. The rim 18 is comprised of plastic material which is transparent for the infrared radiation of the light sources 11 but is opaque with regard to the portion of the electromagnetic spectrum visible to the human eye. This ensures that the driver or the passengers do not see the light sources 11. In other respects, the interior rearview mirror 16 is identical to the embodiment according to FIGS. 4 and 5.

The camera 10 can be arranged at any suitable location behind the mirror glass 1, 12. It is of such a configuration that it covers the required viewing area for the respective application. Since additional devices, such as garage door openers, electrochromic electronic devices, memory drive and others, are often arranged in the interior rearview mirror, the camera 10 is arranged such that the function of these devices is not impaired.

In the described embodiments and the still to be explained embodiments an auxiliary lighting unit for additional illumination can be provided external to the interior rearview mirror 16, depending on the spatial conditions inside the motor vehicle. For example, such an auxiliary lighting unit can be integrated into the interior rear light and/or dome light and/or reading light for the passengers seated in the rear of the automobiles and/or busses. It is also possible to provide the auxiliary lighting unit in the A, B, C, or D columns or any other column within the motor vehicle.

Figure 8:
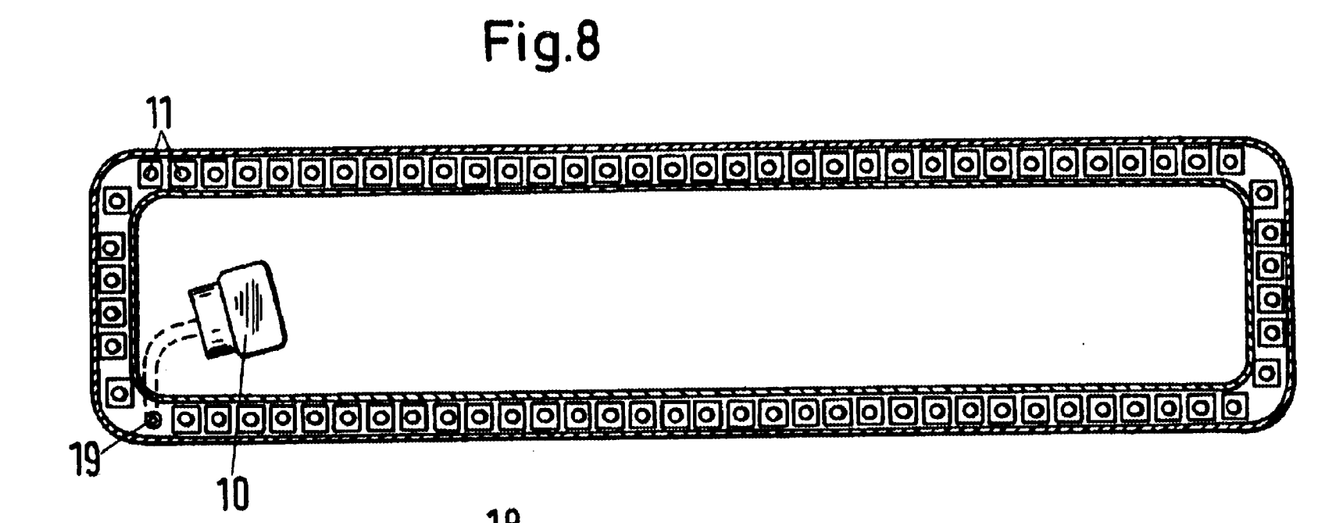
FIG. 8 shows another embodiment of an interior rearview mirror for a motor vehicle in a representation similar to that of FIG. 4.
Figure 9:
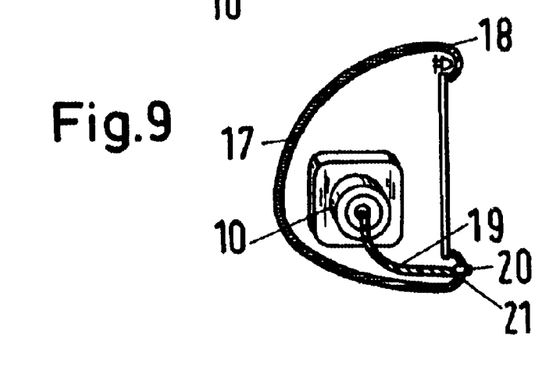
FIG. 9 is a schematic sectional illustration of the interior rearview mirror according to FIG. 8.

In special individual situations an image-transmitting fiber bundle 19 (FIGS. 8 and 9) can be connected to the camera 10. The optics of these fiber bundles 19 have a diameter down to a magnitude as small as 1 mm. The camera 10, in contrast to the previous embodiments, can be arranged in the mirror housing 17 without having a direct view of the interior of the vehicle.

The image is taken by means of the optics 20 on the head of the fiber bundle 19 and guided to the light-sensitive areas of the camera 10. The optical head 20 is preferably mounted in an opening 21 on the mirror frame or rim 18. The light sources 11 are provided, as in the embodiment according to FIGS. 6 and 7, on the rim 18 of the mirror housing 17. The infrared sending LEDs 11, in accordance with the previous embodiments, are distributed uniformly over the entire circumference of the rim 18 of the mirror housing 17.

Figure 10:
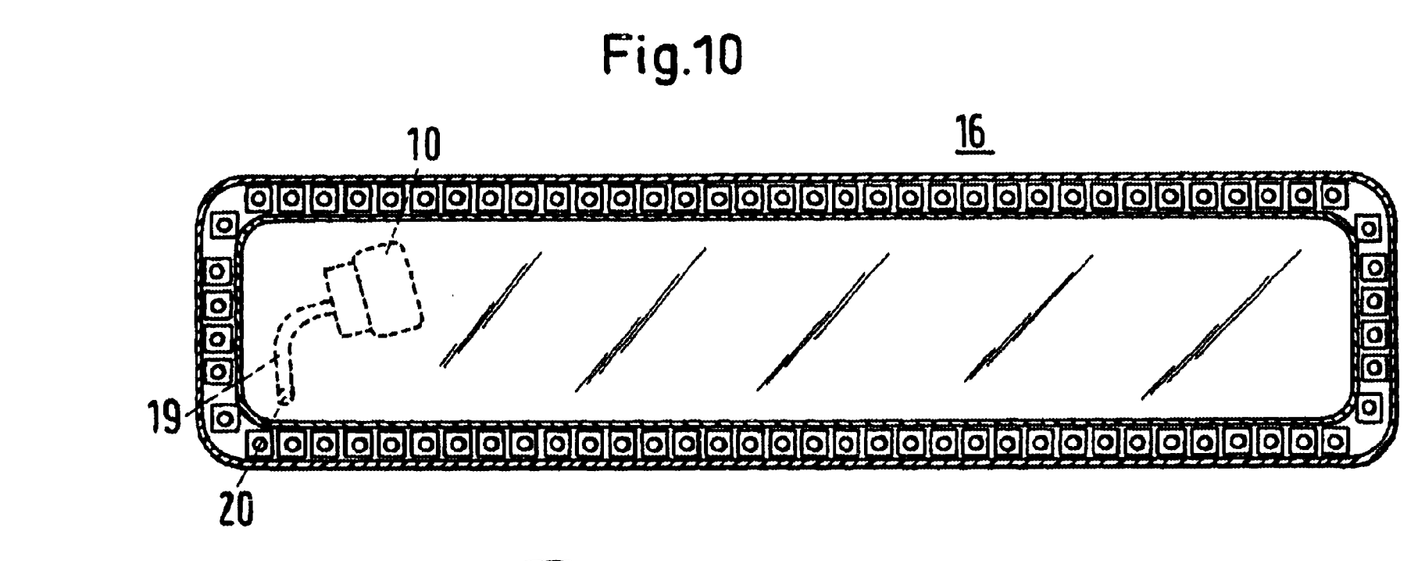
FIG. 10 shows a further embodiment of an interior rearview mirror for a motor vehicle in a representation similar to that of FIG. 4.
Figure 11:
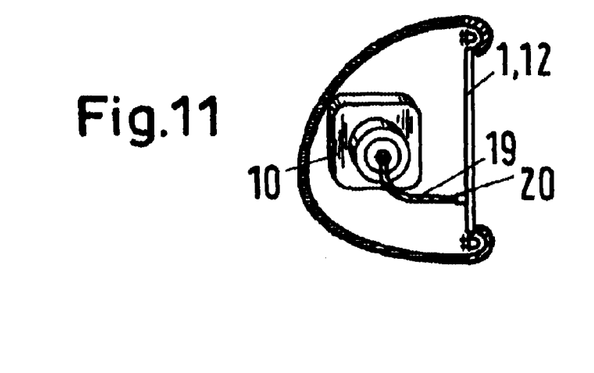
FIG. 11 is a schematic sectional illustration of the interior rearview mirror according to FIG. 10.

FIGS. 10 and 11 show an embodiment in which the optical head 20 of the fiber bundle 19 is arranged behind the infrared-transparent mirror glass 1, 12. Since the mirror glass 1, 12 is opaque to the human eye, the camera 10 and the fiber bundle 19 cannot be seen by the passengers. In other respects, the interior rearview mirror 16 is of identical design as the embodiment according to FIGS. 8 and 9.

Figure 12:
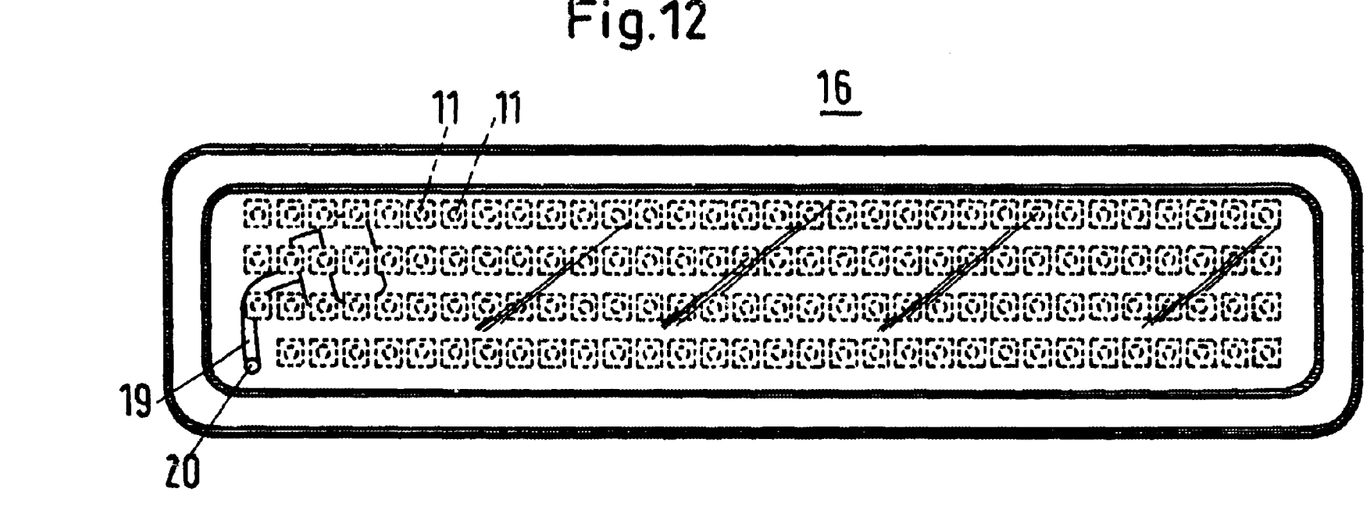
FIG. 12 shows another embodiment of an interior rearview mirror for a motor vehicle in a representation similar to that of FIG. 4.
Figure 13:
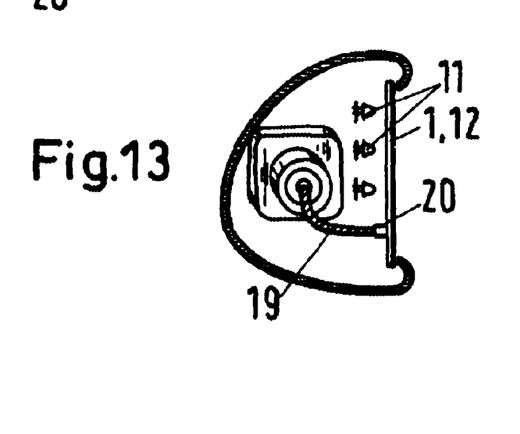
FIG. 13 is a schematic sectional illustration of the interior rearview mirror according to FIG. 12.

FIGS. 12 and 13 show an interior rearview mirror 16 in which the optical head 20 of the fiber bundle 19 is arranged according to the previous embodiment behind the mirror glass 1, 12. The infrared-sending LEDs 11 are arranged behind the mirror glass 1, 12 in rows and columns, forming a matrix. Advantageously, the light sources 11 are uniformly arranged across the entire backside of the mirror glass 1, 12.

Figure 14:
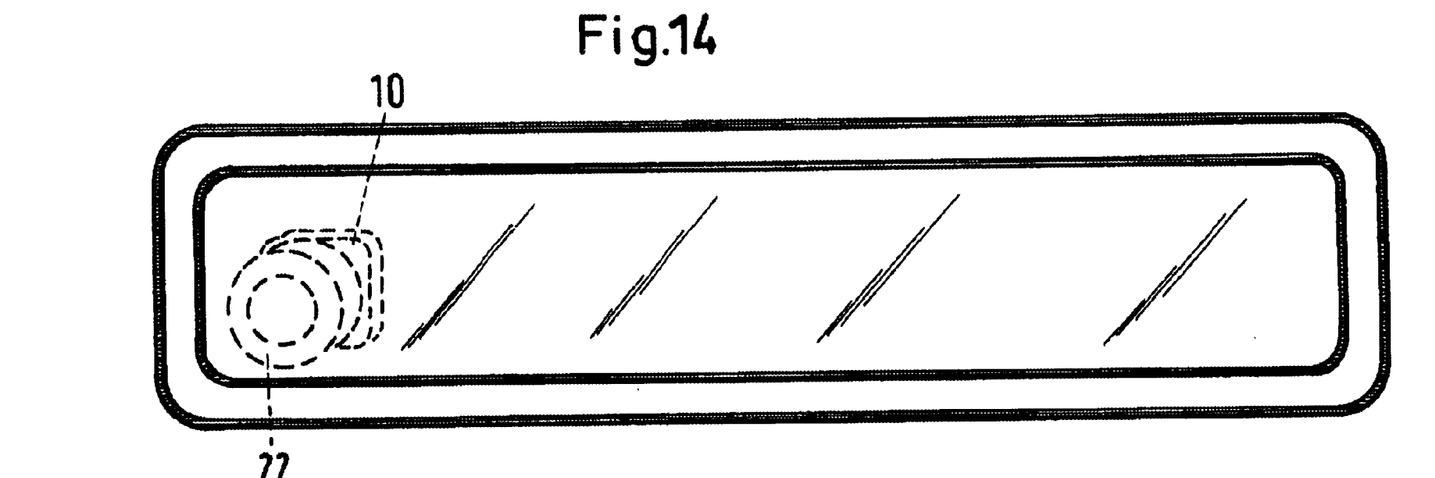
FIG. 14 shows another embodiment of an interior rearview mirror for a motor vehicle in a representation similar to that of FIG. 4.
Figure 15:
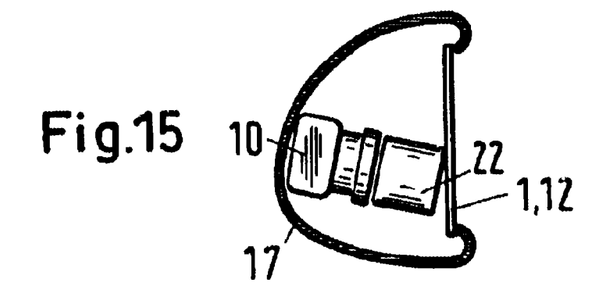
FIG. 15 is a schematic sectional illustration of the interior rearview mirror according to FIG. 14.

As an alternative to the active illumination by means of the infrared sending LEDs 11, a lower light level intensifier tube 22 (FIGS. 14 and 15) can be integrated in front of the camera optics. The lower light level intensifier tube 22 forms an image intensifier tube or image converter tube which, even under extremely bad lighting conditions, allows for a reliable monitoring of the interior of the vehicle in the visible and in the near infrared wavelength ranges. The camera 10 is arranged behind the mirror glass 1, 12 in the mirror housing 17. Depending on the application, the camera is arranged in the mirror housing 17 such that it covers the required viewing area for the particular application.

In order for the camera 10 to be invisible from the interior of the vehicle, the backside of the mirror glass 1, 12, with the exception of the opening 21 for the optical head 20 of the fiber bundle 19 (FIGS. 8 and 9), is covered with a black lacquer in the described embodiments. In the case that the infrared auxiliary lighting unit 11 is to be used behind the mirror glass 1, 12, the lacquer is transparent for infrared light of the respective wavelength, but is opaque in the visible wavelength range. The optics are dereflected and mounted from behind as well as from the side in a light-sealing way on the backside of the mirror glass 1, 12 such that lateral scattered light cannot penetrate through the reflective layer and cannot be seen by the end user, for example, the driver.

The camera 10 can be used for a broad range of applications. For example, it can be used for driver identification, for monitoring the driver's condition, for identifying passengers and passenger positions, for airbag control, for theft surveillance, and similar purposes. For example, it is possible to connect the camera 10 with the electrical system of the vehicle so that the vehicle can be started only when the authorized driver is seated behind the steering wheel of the motor vehicle. Moreover, it is possible to trigger a warning signal should the driver fall asleep behind the steering wheel.

While specific embodiments of the invention have been shown and described in detail to illustrate the inventive principles, it will be understood that the invention may be embodied otherwise without departing from such principles.

What is claimed is:

1. A monitoring device for vehicles, said monitoring device comprising:
   a housing;
   at least one electrochromic mirror glass arranged in said housing so as to have a front side facing an observer;
   said at least one electrochromic mirror glass comprising a reflective layer being reflective in the visible spectral range of light;
   at least one camera arranged behind said reflective layer in a viewing direction viewed from said front side, wherein said at least one camera takes images through the reflective layer wherein said electrochromic mirror glass has an electrochromic layer and wherein said reflective layer is arranged behind said view direction.

2. The monitoring device according to claim 1, wherein said reflective layer is selected from the group consisting of an interference reflective layer, a chromium reflective layer, a titanium reflective layer, and a titanium-chromium reflective layer.

3. The monitoring device according to claim 1, comprising an auxiliary lighting unit configured to provide additional light for said at least one camera.

4. The monitoring device according to claim 3, wherein said auxiliary lighting unit emits light of a wavelength able to pass through said reflective layer.

5. The monitoring device according to claim 3, wherein said auxiliary lighting unit emits light having a wavelength outside of the visible spectral range of light.

6. The monitoring device according to claim 3, wherein said auxiliary lighting unit comprises light-emitting diodes.

7. The monitoring device according to claim 6, wherein said light emitting diodes emit light in the infrared range.

8. The monitoring device according to claim 3, wherein said auxiliary lighting unit is arranged behind said reflective layer in said viewing direction.

9. The monitoring device according to claim 3, wherein said auxiliary lighting unit comprises light-emitting diodes arranged in a matrix of rows and columns.

10. The monitoring device according to claim 3, wherein said housing and said mirror glass form an interior rearview mirror, wherein said housing has a rim, and wherein said auxiliary lighting unit comprises light-emitting diodes arranged on said rim of said housing.

11. The monitoring device according to claim 10, wherein said rim is comprised of a material that is opaque to the human eye.

12. The monitoring device according to claim 1, comprising an image-transmitting fiber bundle connected to said at least one camera.

13. The monitoring device according to claim 12, wherein said fiber bundle has an optical head resting against a backside of said mirror glass.

14. The monitoring device according to claim 12, wherein said fiber bundle has an optical head and is arranged together with said optical head on said rim.

15. The monitoring device according to claim 1, wherein said at least one camera comprises a low light level intensifier.

16. The monitoring device according to claim 15, wherein said low light level intensifier is arranged behind said mirror glass in said viewing direction.

* * * * *